(12) United States Patent
Wellner et al.

(10) Patent No.: US 9,797,516 B2
(45) Date of Patent: Oct. 24, 2017

(54) DIAPHRAGM BELLOWS (71) Applicant: VAT Holding AG, Haag (CH)

(72) Inventors: Marc Wellner, Gams (CH); Fabian Steger, Oberriet (CH)

(73) Assignee: VAT Holding AG, Haag (CH)

( * ) Notice: Subject to any disclaimer, the term of this patent is extended or adjusted under 35 U.S.C. 154(b) by 0 days.

(21) Appl. No.: 15/379,965

(22) Filed: Dec. 15, 2016

(65) Prior Publication Data

US 2017/0175901 A1  Jun. 22, 2017

(30) Foreign Application Priority Data

Dec. 21, 2015 (EP) .................................. 15201681

(51) Int. Cl.
F16J 15/52 (2006.01)
F16J 15/36 (2006.01)

(52) U.S. Cl.
CPC ..................... F16J 15/36 (2013.01)

(58) Field of Classification Search
CPC ..... F16J 3/048; F16J 3/047; F16J 11/15; F16J 15/36; F16J 15/363; F16J 15/366; F16K 41/10
See application file for complete search history.

(56) References Cited

U.S. PATENT DOCUMENTS

| 2,657,075 A | 10/1953 | Schwester et al. |
| 3,124,502 A * | 3/1964 | Radke ..................... F16J 15/20 |
| | | 277/536 |
| 4,183,289 A | 1/1980 | Jinnouchi |
| 4,650,160 A | 3/1987 | Smith |
| 4,674,911 A * | 6/1987 | Gertz ...................... F16F 9/049 |
| | | 256/13.1 |

(Continued)

FOREIGN PATENT DOCUMENTS

| CN | 203363518 | 12/2013 |
| EP | 2177792 | 4/2010 |

(Continued)

Primary Examiner — Gilbert Lee
(74) Attorney, Agent, or Firm — Volpe and Koenig, P.C.

(57) ABSTRACT

The diaphragm bellows includes a plurality of diaphragms (1) with outer edges (3) and inner edges (2), wherein diaphragms (1) that follow one another in the direction of the central longitudinal axis (5) of the diaphragm bellows are welded together alternately in the region of their inner edges (2) and in the region of their outer edges (3). A sliding-guidance device of the diaphragm bellows has at least two ring parts (10, 11). The at least two ring parts (10, 11) each extend through at most 180° in the circumferential direction about the longitudinal axis (5) of the diaphragm bellows and each have a guide portion (12) and a holding portion (13) protruding from the guide portion (12) in the direction of the longitudinal axis (5), the holding portion (13) projecting into an intermediate space (6) located between two adjacent diaphragms (1). The guide portion (12) extends radially outside the two adjacent diaphragms (1) between which the holding portion (13) projects, and has a guide face (16), directed away from the longitudinal axis (5) of the diaphragm bellows, for sliding guidance on the inner surface (15) of a tube (14) surrounding the diaphragm bellows at least along a part of its longitudinal extent.

9 Claims, 6 Drawing Sheets (56) References Cited

U.S. PATENT DOCUMENTS

| | | | |
|---|---|---|---|
| 4,749,200 A * | 6/1988 | Sehnal | F16J 3/047 |
| | | | 277/371 |
| 6,076,557 A | 6/2000 | Carney | |
| 6,485,007 B1 | 11/2002 | Duelli | |
| 8,431,855 B2 | 4/2013 | Margairaz et al. | |
| 2002/0175480 A1 | 11/2002 | Tatzreiter | |
| 2007/0106280 A1 | 5/2007 | Utard et al. | |
| 2016/0033061 A1 | 2/2016 | Tatzreiter | |

FOREIGN PATENT DOCUMENTS

| | | |
|---|---|---|
| GB | 2062132 | 5/1981 |
| JP | 2013221596 | 10/2013 |

\* cited by examiner

DIAPHRAGM BELLOWS

INCORPORATION BY REFERENCE

The following documents are incorporated herein by reference as if fully set forth: European Application No. 15201681.2, filed Dec. 21, 2015.

SUMMARY

The invention relates to a diaphragm bellows having a plurality of diaphragms with outer edges and inner edges, wherein diaphragms that follow one another in the direction of the central longitudinal axis of the diaphragm bellows are welded together alternately in the region of their inner edges and in the region of their outer edges.

Diaphragm bellows are generally used as a flexible sealing element in order to separate different pressure regions in an application. Thus, diaphragm bellows are used for example for vacuum lead-throughs of vacuum valves, wherein the diaphragm bellows encloses the drive rod of the valve and separates the vacuum region from the atmosphere region when the valve is opened and closed. In addition to applications for vacuum lead-throughs for introducing movement into the vacuum, diaphragm bellows can be used for example as compensators for absorbing thermal expansions or assembly tolerances. A further application consists for example in vibration decoupling in a vacuum system, for example between a vacuum pump and a measuring instrument.

Diaphragm bellows consist of diaphragms that are welded together alternately at their outer and inner edges. During production, first of all diaphragm pairs are welded together at their inner edges and subsequently the diaphragm pairs are arranged alongside one another in a row and are welded together at their outer edges. With such diaphragm bellows, travel in an axial and/or lateral and/or angular direction is possible.

In addition to diaphragm bellows, corrugated bellows are known, in which tubes are deformed in a bellows-like manner, with the result that movability is achieved. Specific configurations of corrugated bellows can be gathered for example from U.S. Pat. No. 4,650,160 A and GB 2 062 132 A.

When diaphragm bellows are used, pressure differences usually arise between the interior and the outer side of the diaphragm bellows, wherein the pressure inside the diaphragm bellows can be lower or higher than the pressure outside the diaphragm bellows. Due to such pressure differences (in particular when a higher pressure prevails inside the diaphragm bellows than outside the diaphragm bellows) and/or as a result of gravitational force, it is possible, due to the low side rigidity of the diaphragm bellows, for lateral buckling of the diaphragm bellows to occur to a greater or lesser extent when the diaphragm bellows is sufficiently long. For example, as a result, the diaphragm bellows can come to bear against a rod (e.g. drive rod of a vacuum valve) extending through the inner through-opening in the diaphragm bellows, in regions of the welds of the inner edges of the diaphragm. In the event of the rod moving, the inner edges of the diaphragm thus rub against the rod, and this can result in wear to the weld seams between the inner edges of the diaphragms, with the result that the strength of these weld seams can be impaired over time and leaks can occur.

Therefore, guide parts for guiding the diaphragm bellows in the central regions of its longitudinal extent have already been used. Such a diaphragm bellows can be gathered from US 2002/0175480 A1. This document discloses sliding-guidance rings, arranged inside the diaphragm bellows, for guidance on the outer surface of a rod which passes through the inner through-opening through the diaphragm bellows. The sliding-guidance rings have outwardly protruding protuberances which project into the space between adjacent diaphragms of the diaphragm bellows and fix the sliding-guidance ring in a form-fitting manner with respect to movement in an axial direction of the diaphragm bellows. The inner edges of the two diaphragms, between which each sliding-guidance ring is retained, rest against the outer lateral surface of the sliding-guidance ring. In the compressed state of the diaphragm bellows, the inner edges of adjacent diaphragms are also arranged over the outer lateral surface of the sliding-guidance ring.

In the case of the diaphragm bellows known from CN 203 363 518 U, a solid support ring is welded in place between two portions of the diaphragm bellows.

JP 2013221596 A describes a bellows having guide members configured in a scissors-like manner. This is a complicated structure.

U.S. Pat. No. 4,183,289 A discloses a bellows having a device for restricting extension.

SUMMARY

It is the object of the invention to provide a diaphragm bellows of the type mentioned at the beginning, by way of which advantageous guidance of the diaphragm bellows with respect to lateral buckling is allowed. This object is achieved by a diaphragm bellows having one or more features according to the invention.

The sliding-guidance device according to the invention has at least two ring parts which each extend through less than 180° in the circumferential direction about the longitudinal axis of the diaphragm bellows (=with respect to the polar angle of cylindrical coordinates, the z-axis of which coincides with the longitudinal axis of the diaphragm bellows). The ring parts each have a guide portion and a holding portion protruding from the guide portion in the direction of the longitudinal axis. The holding portion projects radially from the outside into an intermediate space which is located between two adjacent diaphragms which are welded together in the region of their inner edges. The guide portion extends radially outside these two adjacent diaphragms between which the holding portion projects. The guide portion has a guide face directed away from the longitudinal axis of the diaphragm bellows. This guide face serves for sliding guidance on the inner surface of a tube surrounding the diaphragm bellows at least along a part of its longitudinal extent (=the extent of the diaphragm bellows in the direction of its longitudinal axis).

The ring parts can thus be plugged easily into the intermediate space between two adjacent diaphragms from the outer side of the diaphragm bellows, wherein a snap connection is advantageously formed between each ring part and the diaphragms between which the ring part is plugged. The manner in which such a snap connection can be formed is explained in more detail below.

The configuration according to the invention can also easily make it possible to retrofit a diaphragm bellows with a sliding-guidance device.

As a result of the sliding guidance along the inner surface of the tube surrounding the diaphragm bellows, particle production inside the diaphragm bellows, as occurs upon sliding guidance along the outer surface of a rod passing through the through-opening through the diaphragm bellows, is avoided. This is advantageous for applications that are sensitive to particles occurring in the vacuum.

A sliding-guidance device according to the invention can also be employed when there is no rod passing through the through-opening through the diaphragm bellows or when such a rod is only at a distance from the inner edges of the diaphragms that is so short as to be too small for an inner sliding-guidance ring to be used in the diaphragm bellows.

Advantageously, the holding portion has a depression at least on one side with regard to the direction of the longitudinal axis, said depression cooperating with an elevation of the diaphragm adjoining the holding portion on this side, or has an elevation which cooperates with a depression of the diaphragm adjoining the holding portion on this side. It is particularly advantageous for the holding portion to have on one side a depression which cooperates with an elevation of the diaphragm adjoining the holding portion on this side, and on the other side an elevation which cooperates with a depression of the diaphragm adjoining the holding portion on this side. As a result of the cooperation of the at least one elevation on the holding portion with the associated depression of the diaphragm adjacent to the holding portion and/or of the at least one depression in the holding portion with the associated elevation of the adjacent diaphragm, the holding portion can be held in a form-fitting manner so as to be prevented from being pulled out of the intermediate space between the two ring parts into which the holding portion projects, specifically with regard to the position of the diaphragm bellows that the latter takes up when no external force acts on the diaphragm bellows. This position of the diaphragm bellows is referred to as the "neutral position" of the diaphragm bellows below.

In this neutral position of the diaphragm bellows, the ring parts are thus held in a form-fitting manner so as to be prevented from falling out of the intermediate space between the diaphragms between which the holding portions of the ring parts are plugged. In every compressed position of the diaphragm bellows, compared with this neutral position of the diaphragm bellows, the ring parts are thus likewise held in a form-fitting manner so as to be prevented from falling out. Favorably, a form fit which holds the ring parts so that the latter are prevented from falling out is provided even when the diaphragm bellows is extended, with respect to its neutral position, as far as a particular limit value of the length of the diaphragm bellows. At maximum extension of the diaphragm bellows which is specific to the diaphragm bellows and for which a predetermined lifetime of cycles of extension and compression is achieved, the length of the diaphragm bellows is advantageously below said limit value.

As a result of the above-described configuration, a snap connection between the ring parts and the diaphragm bellows located in its neutral position can be formed, i.e. the holding portions, when they are plugged into the intermediate space between the adjacent diaphragms, snap into at least one elevation and/or depression of these diaphragms.

Preferably, the guide portions of the at least two ring parts of the sliding-guidance device extend through more than 180° in total in the circumferential direction about the longitudinal axis of the diaphragm bellows (=extend through a polar angle of more than 180° of cylindrical coordinates, the z-axis of which coincides with the longitudinal axis of the diaphragm bellows), wherein the holding portions of the at least two ring parts are plugged into the intermediate space between the same two adjacent diaphragms. As a result, it is possible to ensure, in any desired positions of the ring parts which the latter take up with respect to the circumferential direction about the longitudinal axis, that the outer edges of the diaphragms are held at a distance from the inner surface of the pipe in the region of the longitudinal extent of the diaphragm bellows in which the sliding-guidance device is arranged.

In an advantageous embodiment, the guide face of the guide portion is formed in a curved manner in a direction away from the longitudinal axis of the diaphragm bellows. As a result, a linear contact can be formed between the guide face and the inner surface of the pipe, with the result that friction and wear can be reduced.

When the terms "inner" and "outer" are used in the context of this document, this relates to the position relative to the longitudinal axis of the diaphragm bellows, i.e. a part located farther in is closer to the central longitudinal axis of the diaphragm bellows than a part located farther out.

BRIEF DESCRIPTION OF THE DRAWINGS

Further advantages and details of the invention are explained in the following text with reference to the appended drawings.

DETAILED DESCRIPTION OF THE PREFERRED EMBODIMENTS

An exemplary embodiment of a diaphragm bellows according to the invention is explained in the following text with reference to FIGS. 1 to 15.

The diaphragm bellows comprises a plurality of diaphragms 1, which can also be referred to as diaphragm disks or annular diaphragms or lamellae. Each diaphragm has an outer edge 3 and an inner edge 2, which delimits a central opening 4 in the diaphragm 1. The inner and outer edges 2, 3 of the diaphragms have circular shapes. In the exemplary embodiment shown, all of the diaphragms have identical radii of their inner edges 2 and identical, comparatively larger radii of their outer edges 3, as is preferred. The diaphragms are configured in particular in a rotationally symmetrical manner.

The diaphragms 1 are arranged concentrically with a central longitudinal axis 5 of the diaphragm bellows. The central openings 4 of the diaphragms 1 together form a through-opening through the diaphragm bellows.

The diaphragms have a corrugated shape. The corrugations of the diaphragms 1 are superimposed on a preferably conical basic shape of the diaphragms. The outside diameter of the diaphragms 1 is in this case favorably more than 5 times greater than the height (=extent in the direction of the longitudinal axis 5) of this conical basic shape.

Preferably two somewhat different configurations of diaphragms are provided, which follow one another in alternation, as is known. Successive diaphragms are arranged such that their conical basic shapes point in opposite directions.

The diaphragms 1 consist of sheet metal with a thickness which is preferably in the range from 0.05 mm to 0.5 mm, particular preferably in the range from 0.075 mm to 0.2 mm. For example, the diaphragms 1 consist of sheet steel, in particular in the form of austenite or ferritic austenite. A configuration made of other metals is possible, for example a nickel-base alloy or titanium.

Successive diaphragms 1 in the direction of the longitudinal axis 5 of the diaphragm bellows are welded together alternately at their inner edges 2 and at their outer edges 3, resulting in a concertina-like configuration. Thus, alternately inwardly open and outwardly open intermediate spaces 6, 7 are provided between successive diaphragms 1.

The corrugations of the diaphragms 1 form elevations and depressions on the two sides of the diaphragms with regard to the direction of the central longitudinal axis 5 of the diaphragm bellows. Thus, elevations and depressions are formed on each of the two side faces (=large faces) of each diaphragm 1, said elevations and depressions having a respective height or depth measured parallel to the direction of the longitudinal axis 5. In the exemplary embodiment, each side face has two elevations and two depressions. More or fewer elevations and/or depressions could also be provided. Each side face could also have only one elevation or only one depression.

In the configuration according to the accompanying figures, end pieces 8, 9 are welded onto the two ends of the diaphragm bellows. These end pieces 8, 9 serve to connect the diaphragm bellows to further parts of a vacuum facility. It would also be conceivable and possible to dispense with the end piece 8 and/or 9 and for the diaphragm bellows to be welded directly to other parts of the vacuum facility at one end or both ends.

End pieces welded onto the ends of the diaphragm bellows can have various shapes.

The configuration of the diaphragm bellows as described thus far is known.

The diaphragm bellows has a sliding-guidance device for guidance on a guide element which is a tube 14 surrounding the diaphragm bellows at least along a part of its longitudinal extent. The sliding-guidance device is formed by two ring parts 10, 11 in the exemplary embodiment. In modified exemplary embodiments, the sliding-guidance device could also be formed by more than two ring parts. Each ring part has a guide portion 12 and a holding portion 13 protruding inwardly (=in the direction of the longitudinal axis 5) therefrom. The holding portion 13 projects into an outwardly open intermediate space 6 between two adjacent diaphragms 1 which are welded together in the region of their inner edges 2. The holding portions 13 also secure the ring parts 10, 11 in a form-fitting manner so as to prevent displacement in the direction of the longitudinal axis 5 of the diaphragm bellows. The holding portions 13 of the ring parts 10, 11 of the sliding-guidance device project into the same intermediate space 6 between two adjacent diaphragms 1.

The ring parts 10, 11 are concentric with the diaphragms.

The guide portion extends radially outside the two diaphragms 1, between which the intermediate space 6 is located into which the holding portion 13 of this ring part 10, 11 projects. The guide portion 12 thus also extends radially outside the diaphragms 1 that are welded to these two diaphragms 1 in the region of their outer edges 3. At least in a position of the diaphragm bellows in which the diaphragm bellows is compressed compared with its neutral position, the guide portion 12 also extends radially outside the two diaphragm pairs which are welded together in the region of their outer edges 3 and adjoin, on both sides, the two diaphragm pairs that are welded in the region of their outer edges 3 and adjoin the holding portion 13 on both sides.

The guide portions 12 of the ring parts 10, 11 serve for sliding guidance of the diaphragm bellows on the inner surface 15 of a tube 14 surrounding the diaphragm bellows at least along a part of its longitudinal extent (=extent in the direction of the longitudinal axis 5). Such a tube 14 is illustrated for example in FIG. 4. The tube 14 is secured in this case to one of the end pieces 8, in particular by welding. A guide face 16, directed away from the longitudinal axis of the diaphragm bellows, of each guide portion 12 cooperates with the inner surface 15 of the tube 14. As seen in the longitudinal central section through the diaphragm bellows, cf. FIG. 4 and FIG. 5, the guide face 16 is configured in a corrugated manner in the exemplary embodiment, for example in a manner curved in the form of a circular arc. It is thus possible for linear contact with the surface 15 to be achieved.

The radial extent a along which the holding portion 13 of each ring part 10, 11 extends in the intermediate space 6 between the adjacent diaphragms 1 is greater than the radial extent b of the guide portion 12, preferably more than twice as great.

The holding portion 13 which protrudes inwardly from the guide portion 12 and projects into the intermediate space 6 between the adjacent diaphragms 1 has an elevation 17 on one of its side faces and a depression 18 on the opposite side face. As seen in the longitudinal central section through the diaphragm bellows, cf. FIGS. 4 and 5, the elevation 17 has a height measured parallel to the longitudinal axis 5 and the depression 18 has a depth measured parallel to the longitudinal axis 5. The elevation 17 on the holding portion 13 cooperates with a depression 19 of the diaphragm 1 adjoining the holding portion 13 on this side. The depression 18 cooperates with an elevation 20 of the diaphragm 1 adjoining the holding portion 13 on this side. In the position which the diaphragm bellows takes up without any external forces acting, i.e. in the neutral position of the diaphragm bellows, the elevation 17 on the holding portion 13 projects into the depression 19 of the diaphragm 1 and the elevation 20 of the diaphragm 1 projects into the depression 18 in the holding portion 13. As a result, the ring parts 10, 11 are secured in a form-fitting manner so as to be prevented from being pulled out of the intermediate space 6 between the diaphragms 1.

This form fit remains when the diaphragm bellows is compressed, starting from its neutral position. The position of the diaphragm bellows up to which the diaphragm bellows is preferably compressed to a maximum in order to achieve as long a lifetime of the diaphragm bellows as possible is illustrated in FIGS. 8 to 11.

A position of the diaphragm bellows in which the latter is stretched compared with its neutral position is illustrated in FIGS. 12 to 15. Preferably, the diaphragm bellows is stretched at most as far as this position, in order to achieve a long lifetime of the diaphragm bellows. In this position, there is still a form fit, which counteracts any pulling out of the holding portions 13 and thus of the ring parts 10, 11 from the intermediate space 6 between the diaphragms 1.

When the diaphragm bellows is compressed at most as far as the position illustrated in FIGS. 8 to 11 and is extended at most as far as the position illustrated in FIGS. 12 to 15, a specified number of cycles of compression and extension is achieved. If a comparatively smaller number of cycles is sufficient, the diaphragm bellows can accordingly be compressed and/or extended to a greater extent.

When a ring part 10, 11 is plugged into the intermediate space 6 between the diaphragms 1 by way of its holding portion 13, specifically in a position of the diaphragm bellows in which there is a form fit between the holding portion 13 and the adjacent diaphragms 1 in the plugged-in state, the diaphragms 1 are pushed apart, increasing the size of the intermediate space 6, when the holding portion 13 is plugged in, and then contract again on account of their elasticity, reducing the size of the intermediate space 6, such that the elevations 17, 20 and depressions 19, 18 engage in one another. A snap connection between the ring parts 10, 11 and the diaphragms 1 is thus formed.

The holding portion 13 could also have an elevation or depression only on one of its sides, said elevation or depression cooperating with a depression or elevation of the diaphragm 1 adjoining on this side, in order to form a form fit between the holding portion 13 and the diaphragms 1 (with respect to the neutral position of the diaphragm bellows). The holding portion 13 could also have both an elevation and a depression on one side or on both sides.

Figures 1, 2, 6, 7:
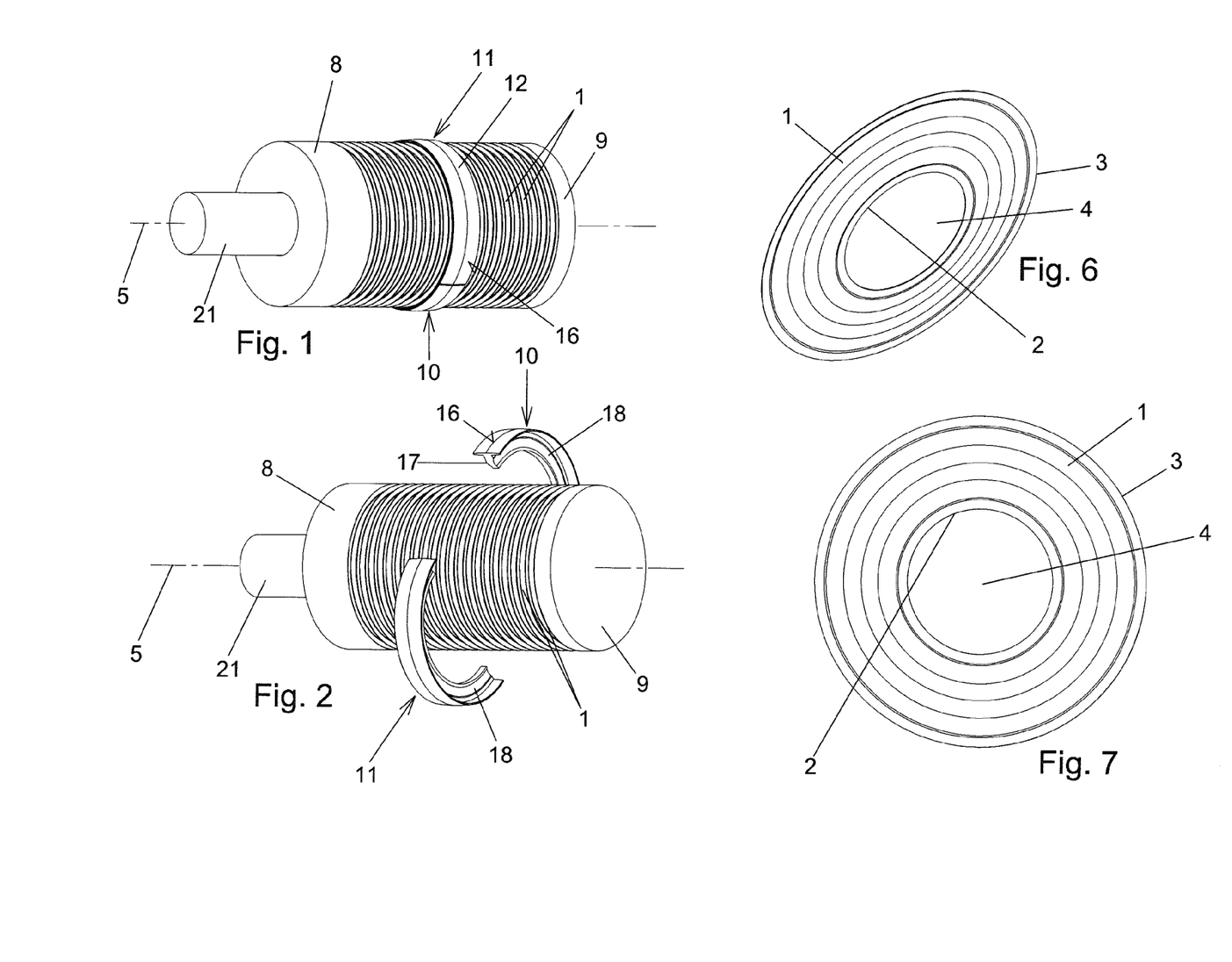
FIG. 1 shows a perspective view of a diaphragm bellows according to the invention, having end piece attached to both ends and a rod passing through the diaphragm bellows, wherein the diaphragm bellows is in its neutral position.
FIG. 2 shows the unit from FIG. 1, wherein the ring parts of the diaphragms are illustrated in a removed manner.
FIGS. 6 and 7 show a perspective view and a plan view of one of the diaphragms of the diaphragm bellows.
Figure 3:
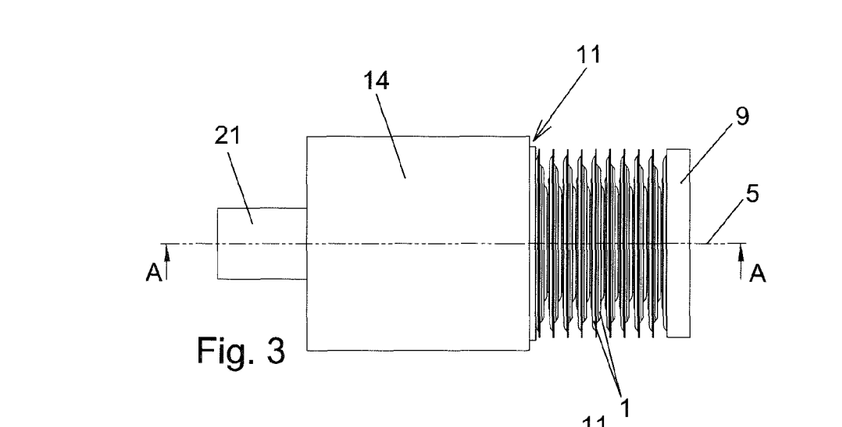
FIG. 3 shows a side view (at right angles to the longitudinal axis of the diaphragm bellows), wherein a tube for guiding the diaphragm bellows is additionally attached to one of the end pieces.
Figure 4:
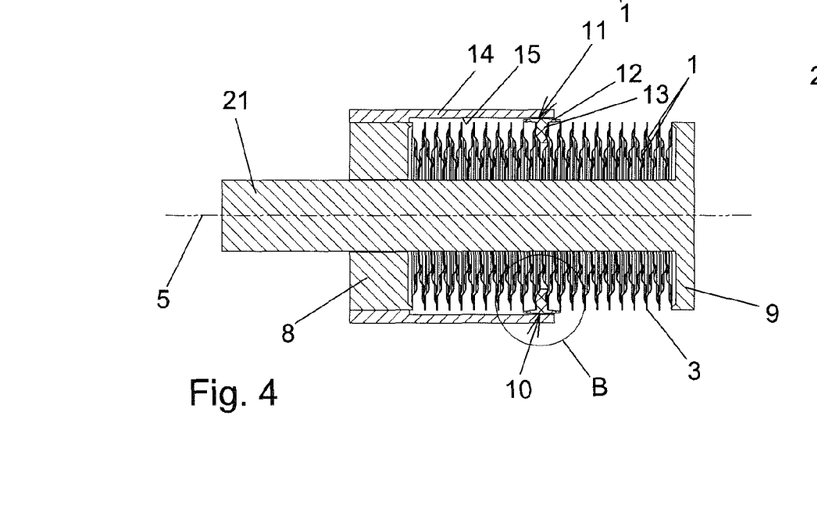
FIG. 4 shows a section along the line AA in FIG. 3.
Figure 5:
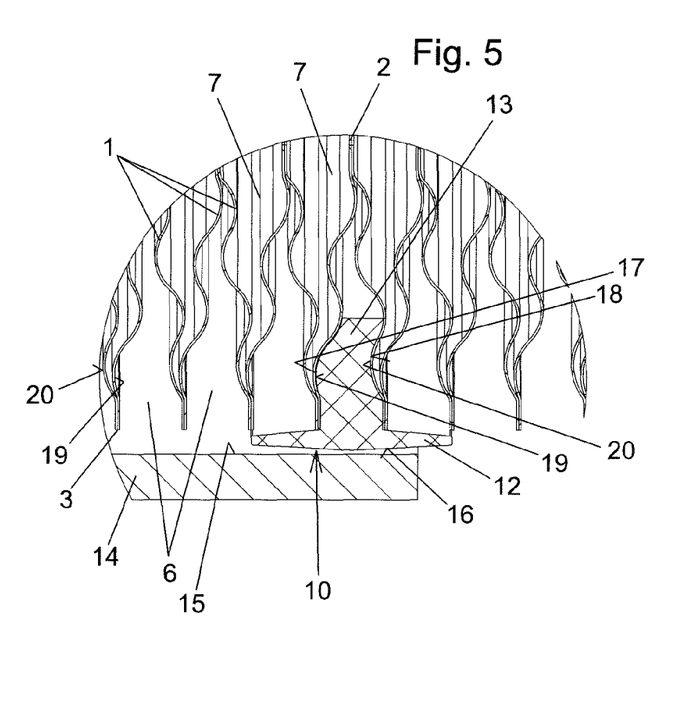
FIG. 5 shows an enlarged detail B from FIG. 4.
Figures 8, 9, 10:
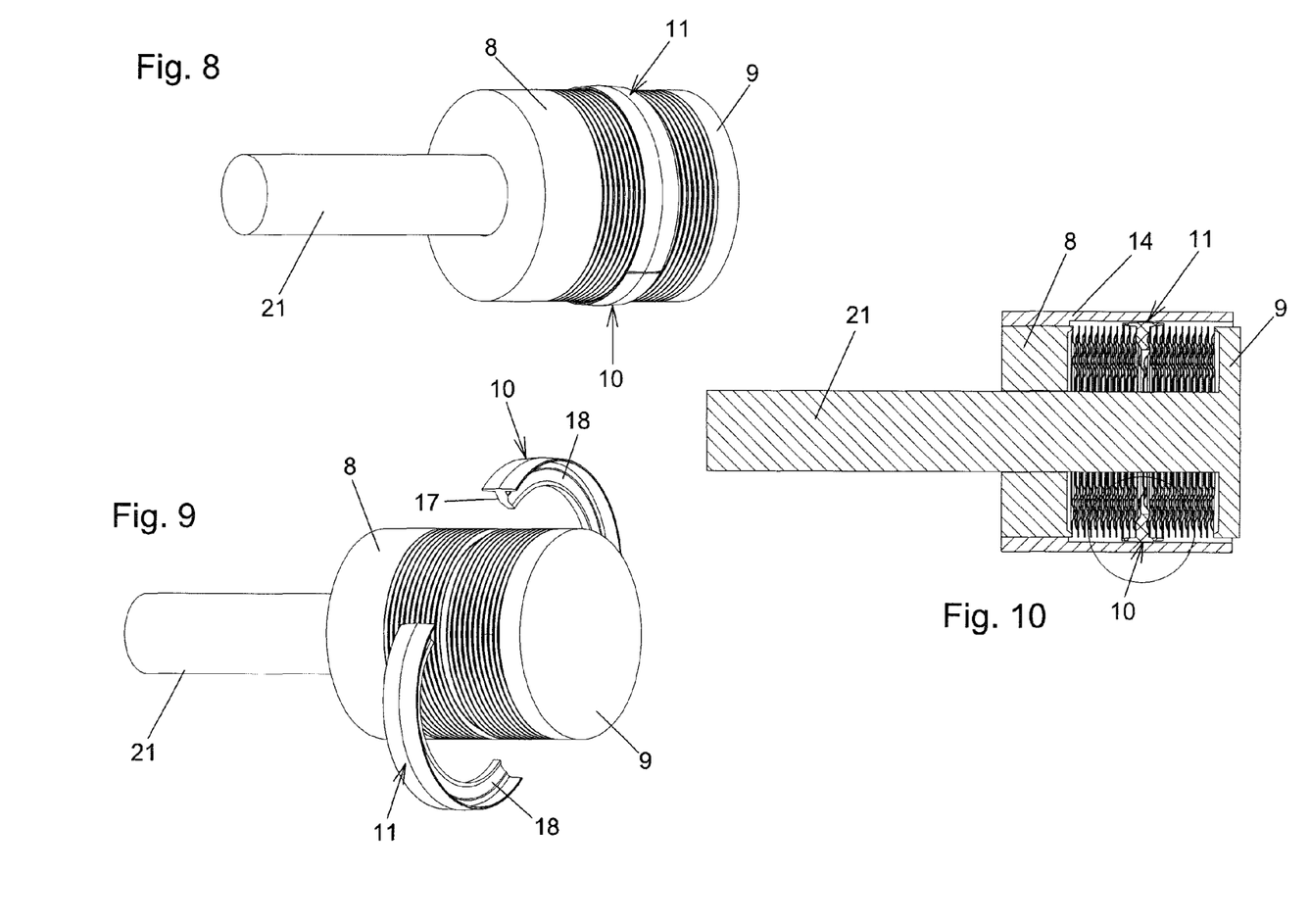
FIGS. 8, 9, 10 and 11 show illustrations analogous to FIGS. 1, 2, 4 and 5 but in a further compressed position of the diaphragm bellows compared with the neutral position of the diaphragm bellows.
Figure 11:
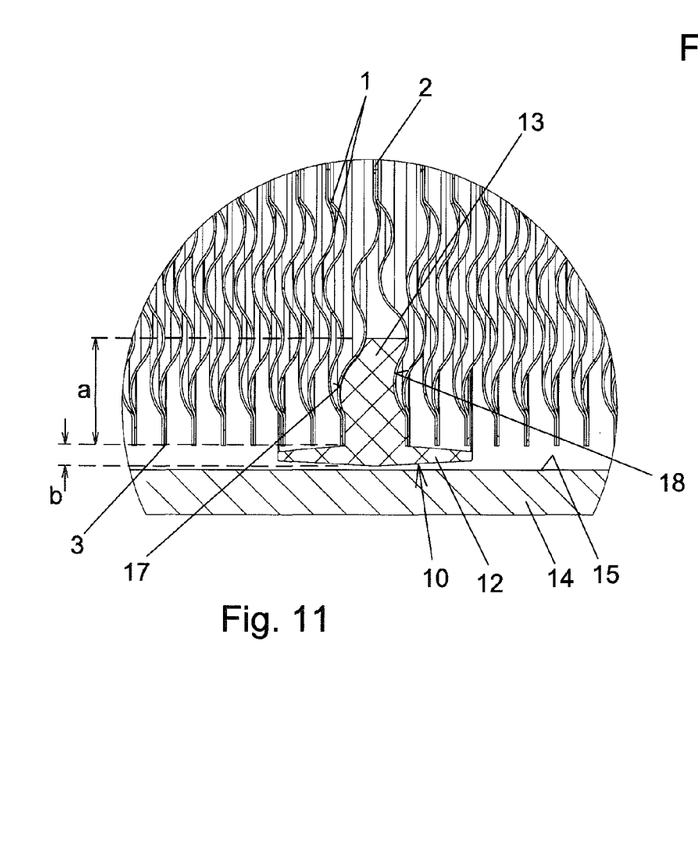
Figure 12:
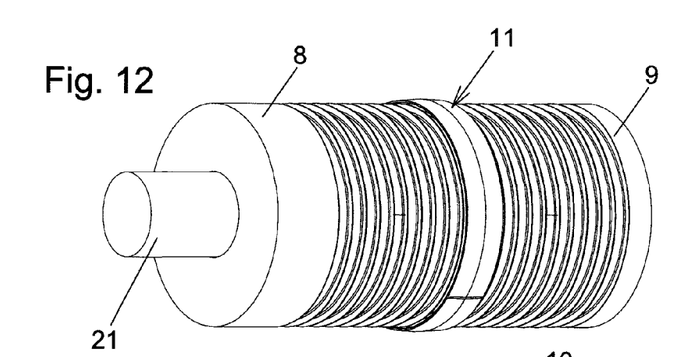
FIGS. 12, 13, 14 and 15 show illustrations analogous to FIGS. 1, 2, 4 and 5 but in a further extended position of the diaphragm bellows compared with the neutral position of the diaphragm bellows; an FIGS. 16, 17 and 18 show longitudinal central sections analogous to FIGS. 4, 10 and 14 in a possible application of the diaphragm bellows.
Figure 13:
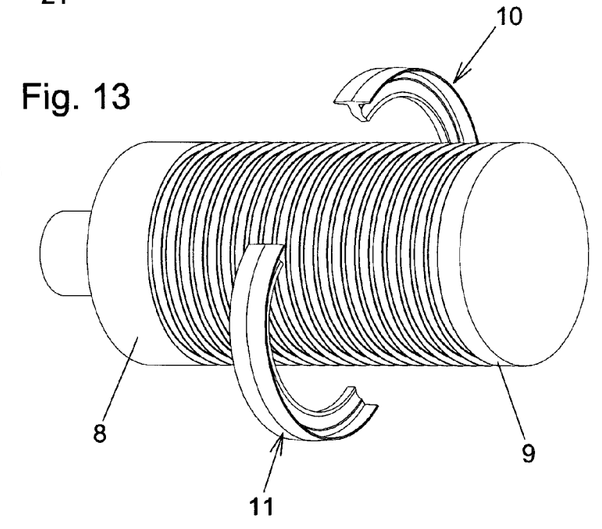
Figure 14:
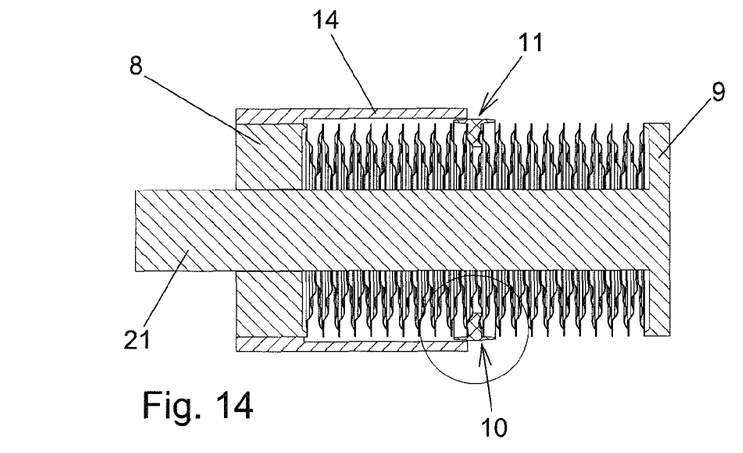
Figure 15:
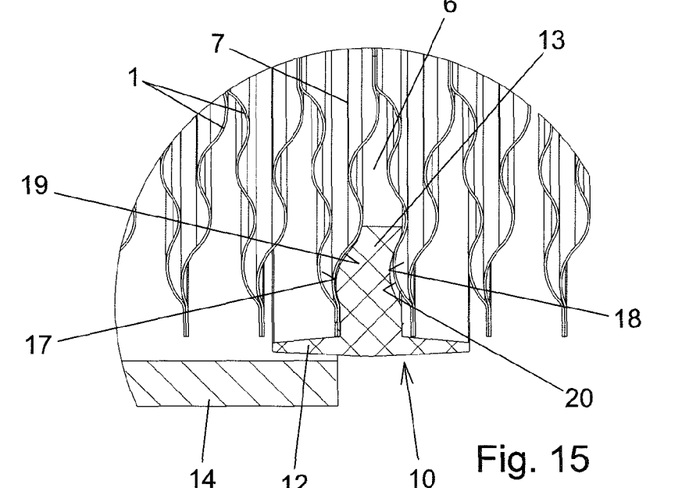

Advantageously, the contours of the side faces of the holding portion 13 correspond to the contours of the adjacent diaphragms 1 in the neutral position of the diaphragm bellows, as is apparent in particular from FIG. 5. It is particularly preferred for the holding portion 13 to be formed, with respect to the longitudinal central section, with a shape which corresponds to the shape that the intermediate space 6 assumes via the radial expansion of the holding portion 13 in the neutral position of the diaphragm bellows when no holding portion 13 has been plugged into the intermediate space 6. In other words, in the neutral position of the diaphragm bellows, the diaphragm bellows does not undergo any deformation by the plug-in holding portions 13. Therefore, the thickness, measured in the direction of the longitudinal axis 5 of the diaphragm bellows, of the holding portion 13 also decreases in the radial direction toward the longitudinal axis 5.

Favorably, the ring parts 10, 11 have a T shape as seen in the longitudinal central section through the diaphragm bellows, wherein said T shape could also be asymmetrical (i.e. one protruding part of the guide portion is shorter than the other). In principle, an L shape would also be possible, for example.

If a protruding guide portion 12 were to be omitted entirely, such that the outer end-side edge of the holding portion 13 would then take on the guidance function, it would be necessary to prevent the holding portion 13 from being pushed so far inward that its outer edge is located radially inside the outer edge 3 of the diaphragms 1, for example through a sufficient form fit of the holding portion 13 with the diaphragms 1 and/or in that the diaphragm bellows is not extended too much. By way of a configuration having a protruding guide portion 12 that can be supported at least on the outer edges 3 of the diaphragm pairs 1 located on both sides of the holding portion 13, the guide surface 16 is at any rate located radially outside the outer edges 3 of the diaphragms 1, however.

In order to allow the ring parts 10, 11 to be plugged in between the diaphragms 1 after all the diaphragms 1 have been welded together, the ring parts 10, 11 each extend through at most 180° in the circumferential direction about the longitudinal axis 5.

In the exemplary embodiment, two ring parts 10, 11 are provided, which are each in the form of a half ring and together form a ring that completely surrounds the diaphragms 1 in the state plugged in between the same diaphragms 1. Such a ring completely surrounding the diaphragms 1 could also be formed by more than two ring parts, for example by three ring parts that each extend through 120°.

The two or more ring parts 10, 11 plugged in between the same diaphragms 1 at any rate extend as a whole through more than 180° in the circumferential direction about the longitudinal axis 5.

In an advantageous embodiment, the ring parts 10, 11 consist of plastics material, for example PTFE (polytetrafluoroethylene), polymer-reinforced PTFE, PEEK (polyether ether ketone) or polyimide. In other embodiments, the ring parts 10, 11 can be formed from metal, optionally coated, in particular in the region of the guide face 16. Combinations of plastics material and metal materials are also conceivable and possible.

Figure 16:
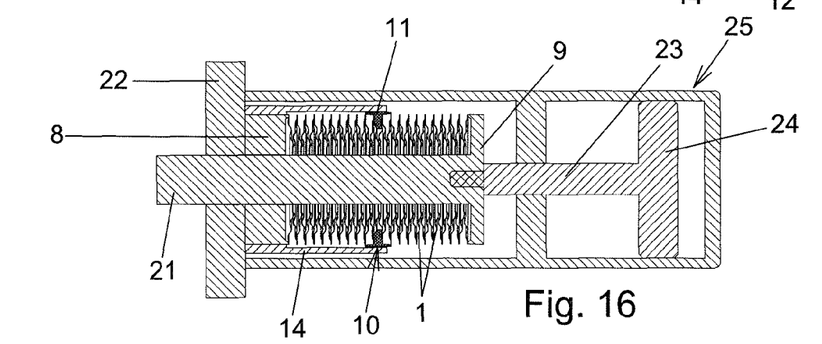
Figure 17:
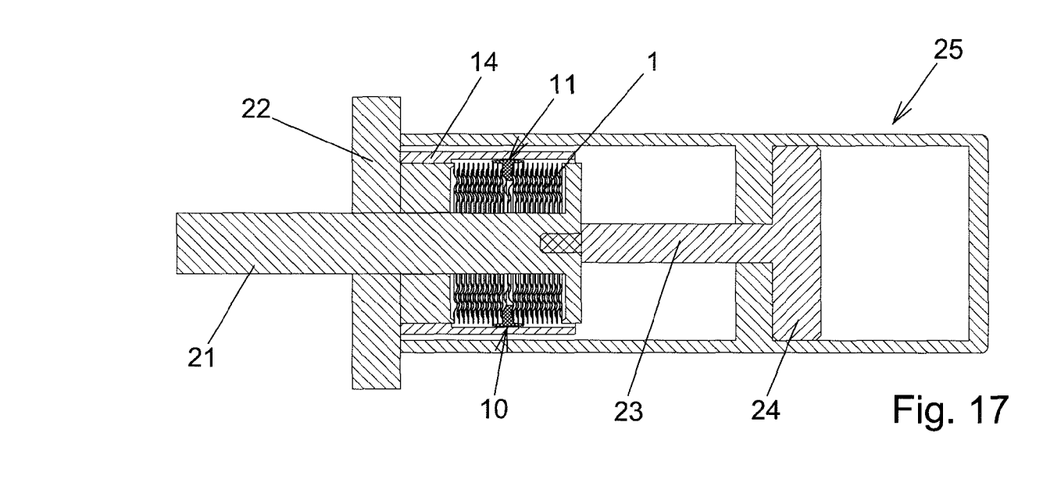
Figure 18:
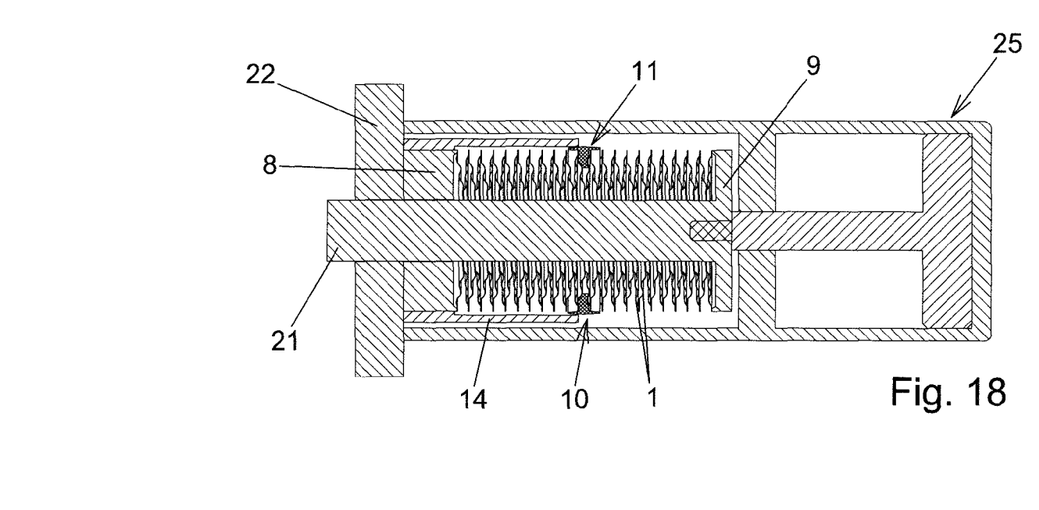

Illustrated in FIGS. 1 to 15 is a rod 21 which is secured to one of the end pieces 9, is formed for example in one piece with the latter and extends through the through-opening which extends through the diaphragm bellows 1, and through an opening in the other end piece 8. In this way, a movement exerted on the end piece 9 can be transmitted, by means of the diaphragm bellows, into a vacuum region of a vacuum facility via the rod 21. A possible application of this kind is illustrated in FIGS. 16 to 18. The end piece 8 is attached to the wall 22 (only partially illustrated) of a vacuum chamber, for example welded or screwed thereto. The wall 22 has an opening for the passage of the rod 21. The end piece 9 is provided with a threaded bore (which extends in this case into the region of the rod 21), into which the end of a piston rod 23 is screwed (this is not illustrated in FIGS. 1 to 15). The piston rod 23 is secured to the piston 24 of a piston/cylinder unit.

The figures illustrate only one sliding-guidance device of the diaphragm bellows, said device being formed by the two ring parts 10, 11 in the exemplary embodiment. Depending on the length of the diaphragm bellows, more than one such sliding-guidance device could also be provided. In each case at least two ring parts 10, 11 are then thus plugged into different intermediate spaces 6, which are spaced apart from one another in the direction of the longitudinal axis 5.

In the figures, the tube 14 surrounds only one such portion of the longitudinal extent of the diaphragm bellows such that the guidance function is fulfilled by the tube 14. However, the tube 14 could also extend along a greater portion of the longitudinal extent of the diaphragm bellows or along the entire diaphragm bellows.

A diaphragm bellows according to the invention can also be used without a rod 21 passing through its through-opening. A duct-like connection between two vacuum regions of a vacuum facility can then be created via the diaphragm bellows.

KEY TO THE REFERENCE SIGNS

1 Diaphragm
2 Inner edge

3 Outer edge
4 Opening
5 Longitudinal axis
6 Intermediate space
7 Intermediate space
8 End piece
9 End piece
10 Ring part
11 Ring part
12 Guide portion
13 Holding portion
14 Tube
15 Surface
16 Guide face
17 Elevation
18 Depression
19 Depression
20 Elevation
21 Rod
22 Wall
23 Piston rod
24 Piston
25 Piston/cylinder unit

The invention claimed is:

1. A diaphragm bellows, comprising:
a plurality of diaphragms with outer edges and inner edges, said diaphragms follow one another in a direction of a central longitudinal axis of the diaphragm bellows and are welded together alternately in a region of said inner edges and in a region of said outer edges;
at least one sliding-guidance device adapted for sliding guidance on a tube surrounding the diaphragm bellows at least along a part of a longitudinal extent thereof, said sliding-guidance device including at least two ring parts which each extend through at most 180° in a circumferential direction about the longitudinal axis of the diaphragm bellows, said at least two ring parts each have;
a guide portion and
a holding portion protruding from the guide portion in a direction of the longitudinal axis;
said holding portion projecting into an intermediate space located between two adjacent ones of the diaphragms,
said guide portion extends radially outside of the two adjacent ones of the diaphragms between which the holding portion projects and has a guide face, directed away from the longitudinal axis of the diaphragm bellows, adapted for sliding guidance on an inner surface of the tube surrounding the diaphragm bellows at least along a part of the longitudinal extent thereof, and
wherein the holding portion has a depression at least on one side with regard to a direction of the longitudinal axis, said depression cooperating with an elevation of the diaphragm adjoining the holding portion on said one side, or has an elevation at least on one side with regard to the direction of the longitudinal axis, and said elevation cooperates with a depression of the diaphragm adjoining the holding portion on said one side.

2. The diaphragm bellows according to claim 1, wherein, in a position of the diaphragm bellows in which no external force acts on the diaphragm bellows, the holding portions of the ring parts of the sliding-guidance device are held in a form-fitting manner in the intermediate space between the two adjacent ones of the diaphragms against pulling out from the intermediate space in a radial direction.

3. The diaphragm bellows according to claim 1, wherein the holding portion has on one side a depression which cooperates with an elevation of the diaphragm adjoining the holding portion on said side, and on another side an elevation which cooperates with a depression of the diaphragm adjoining the holding portion on said other side.

4. The diaphragm bellows according to claim 1, wherein a thickness of the holding portion measured in the direction of the longitudinal axis of the diaphragm bellows decreases in a radial direction toward the longitudinal axis of the diaphragm bellows.

5. The diaphragm bellows according to claim 1, wherein the diaphragms of the diaphragm bellows are configured with corrugations as seen in longitudinal central section through the diaphragm bellows, and the corrugations of the diaphragms form elevations and depressions on both side faces of the respective diaphragm with regard to the direction of the longitudinal axis of the diaphragm bellows.

6. The diaphragm bellows according to claim 1, wherein the ring parts are configured in a T-shaped manner as seen in longitudinal central section through the diaphragm bellows.

7. The diaphragm bellows according to claim 1, wherein the guide portions of the at least two ring parts of the sliding-guidance device extend through more than 180° in total in a circumferential direction about the longitudinal axis of the diaphragm bellows, and the holding portions of said at least two ring parts are plugged into a same intermediate space between the two adjacent ones of the diaphragms.

8. The diaphragm bellows according to claim 7, wherein the sliding-guidance device is formed by the two ring parts which each extend through 180° in the circumferential direction about the longitudinal axis of the diaphragm bellows.

9. The diaphragm bellows according to claim 1, wherein guide faces of the guide portions of the ring parts are formed in a curved manner in a direction away from the longitudinal axis of the diaphragm bellows.

* * * * *